United States Patent [19]

Patel

[11] 4,276,609

[45] Jun. 30, 1981

[54] CCD MEMORY RETRIEVAL SYSTEM

[75] Inventor: Narendra M. Patel, San Antonio, Tex.

[73] Assignee: NCR Corporation, Dayton, Ohio

[21] Appl. No.: 1,034

[22] Filed: Jan. 4, 1979

[51] Int. Cl.³ .......................... G06F 13/00; G11C 9/06
[52] U.S. Cl. ................................................ 364/900
[58] Field of Search ... 364/200 MS File, 900 MS File

[56] References Cited

U.S. PATENT DOCUMENTS

| | | | |
|---|---|---|---|
| 3,218,611 | 11/1965 | Kilburn et al. | 364/200 |
| 3,581,291 | 5/1971 | Iwamoto | 364/200 |
| 3,588,839 | 6/1971 | Belady | 364/200 |
| 3,949,369 | 4/1976 | Churchill, Jr. | 364/200 |
| 3,967,247 | 6/1976 | Andersen et al. | 364/200 |
| 3,986,171 | 10/1976 | Spoelder | 364/900 |
| 4,055,851 | 10/1977 | Jenkins et al. | 364/200 |
| 4,070,706 | 1/1978 | Scheuneman | 364/200 |
| 4,084,230 | 4/1978 | Matick | 364/200 |

*Primary Examiner*—Gareth D. Shaw
*Assistant Examiner*—Eddie P. Chan

*Attorney, Agent, or Firm*—J. T. Cavender; Wilbert Hawk, Jr.; Richard W. Lavin

[57] ABSTRACT

A data store and retrieval system is disclosed in which a pair of RAM buffer memories are coupled to a CCD page main memory to provide high-speed read/write access by a computer to the main memory. Each buffer memory has stored therein a page of data transferred from the CCD main memory. Compare means included in the system compares the page address requested by the computer with the page address stored in the buffer memories. If a comparison is found, the designated buffer memory is accessed for the requested data. Both read/write access is available under these conditions. If a no comparison is found, logic circuits located in the system using the requested page address transfer the page in which the requested address is located from the CCD main memory to the RAM buffer memories for access by the computer. If a write operation had occurred on a page stored in the buffer memories, the altered page is transferred back to the CCD main memory before a new page of data is transferred to the buffer memory other than the buffer memory in which the previous page address was found.

7 Claims, 9 Drawing Figures

CCD MEMORY RETRIEVAL SYSTEM

BACKGROUND OF THE INVENTION

The present invention reltes to a data processing system and more particularly to a system for accessing serially-stored memories, especially charge-coupled memories. Charge-coupled devices (CCD) have been investigated for use in semiconductor memories, particularly those employed metal-oxide-silicon (MOS) technology in order to lower the cost of such memories as compared to dynamic random-access memories (RAM), magnetic disc and tape memories which are in present use. Present CCD memory technology has fabricated CCD memories having four times the density per package at ¼ the cost per bit of a dynamic RAM memory. One disadvantage of CCD memories systems is their slower access time as compared to random-access memories employing MOS technology. It is therefore an object of the present invention to provide a serial memory system in which access time to the serial memory approaches those presently obtained with random-access memory systems. It is a further object of this invention to provide a CCD memory system which is relatively simple in structure and therefore low in cost.

SUMMARY OF THE INVENTION

In order to fulfill these objects, there is disclosed a memory system which includes a main memory constructed of charge-coupled devices in which are stored blocks or pages of data, a pair of RAM memory buffers in which are temporarily stored a page of data transferred from the CCD main memory and means for comparing a requested page address with the address stored in each of the buffers. If a comparison is found by the system, data may be read from or written into the appropriate page located in the buffer. If no comparison is found, a new block or page of data is transferred into one of the page buffers and memory access is generated to the new page of data. Signals are generated when a write operation has occurred on a page located in the buffers requiring the page to be transferred back to the main memory before a new page is stored in the buffer. Logic circuits determine in which buffer the new page is to be stored.

DETAILED DESCRIPTION OF THE PREFERRED EMBODIMENT

Figure 1A:
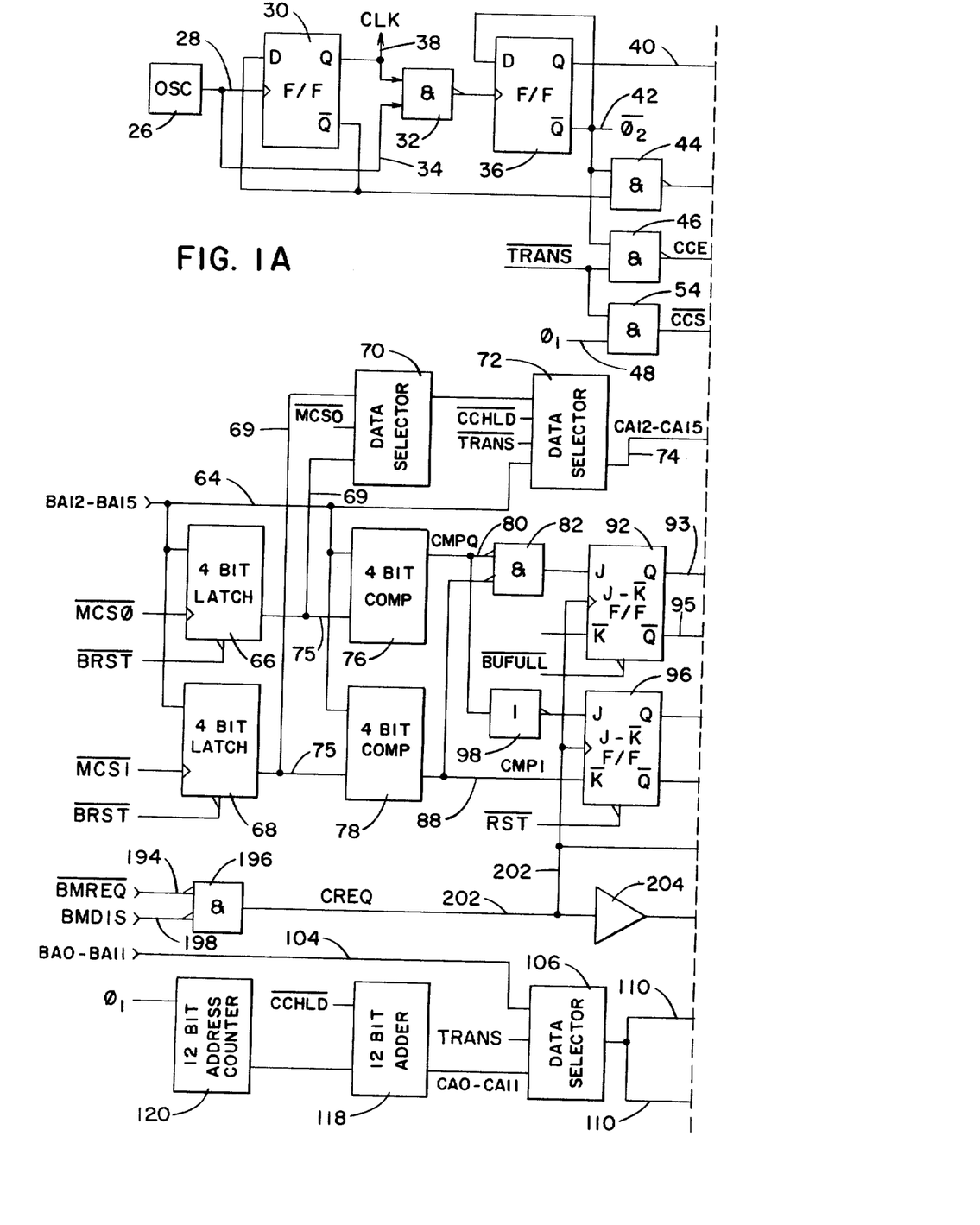
FIGS. 1A and 1B taken together form a general block diagram of the memory system of the present invention.
Figure 1B:
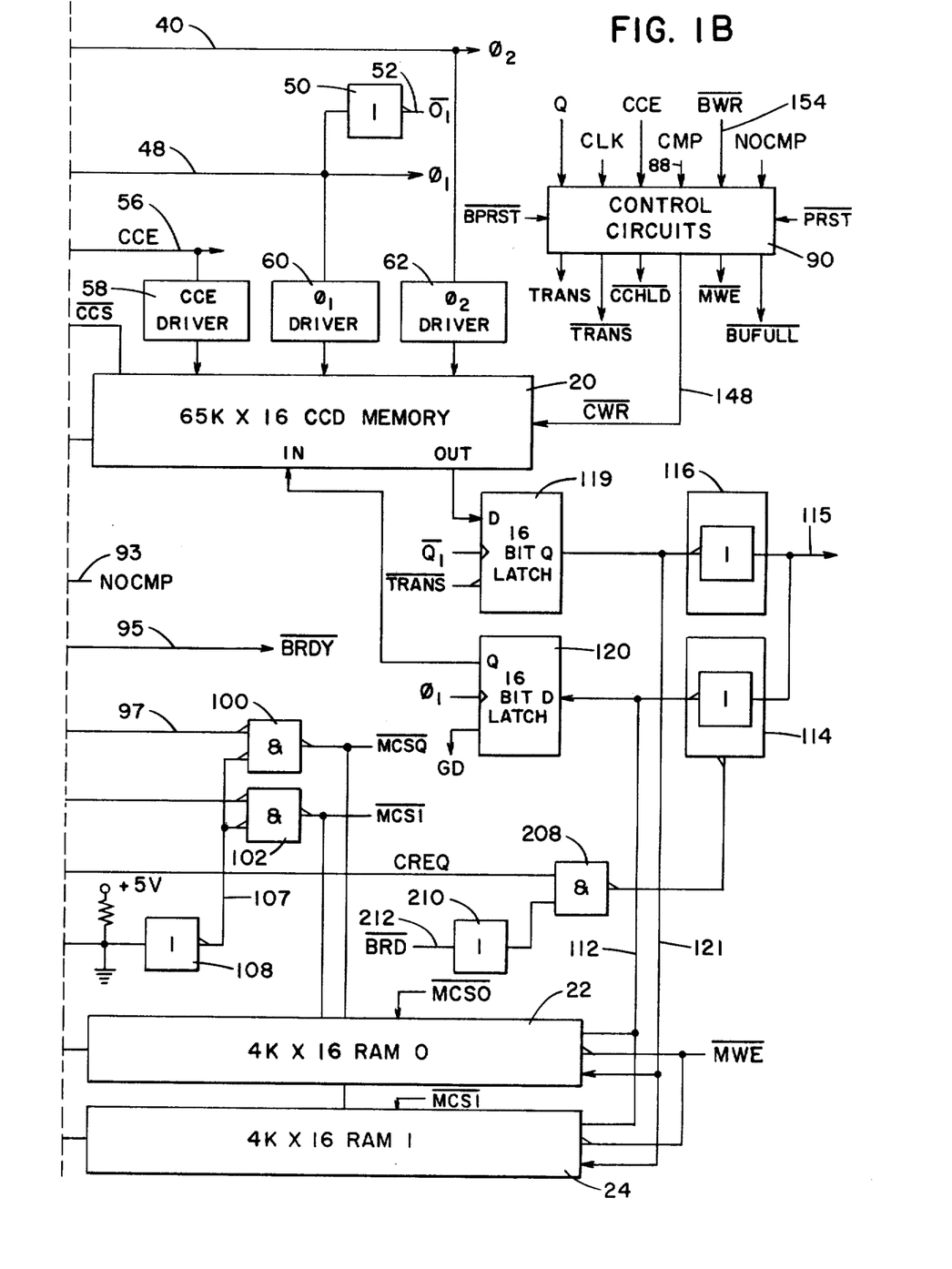

Referring now to FIGS. 1A and 1B together, there is disclosed a block diagram of the CCD memory system associated with a central processing unit (CPU) in which data for the system is stored in a CCD memory device 20 (FIG. 1B) having a capacity of 65K × 16 bit words of data. An example of such a memory device which is presently commercially available is Texas Instruments TMS 3064 based on a 16 bit word size. The CCD memory device 20 has stored therein 16 blocks or pages of data with each page comprising 4,096 × 16 bit words of data. Each page address of a 16 bit memory access data request generated by the CUP is a 4 bit field with 12 bits reserved for addressing data within a particular page.

Associated with the CCD memory 20 are a pair of buffer memories 22 and 24 (FIG. 1B) each comprised of sixteen 4,096 × 1 static RAM memory devices which provides a relatively high-speed memory access. An example of a commercially-available static RAM memory device that may be utilized in the present embodiment is Texas Instruments TMS 4044. As will be described more fully hereinafter, the RAM buffers 22 and 24 each contains a page or block of data transferred from the CCD memory 20, the buffer memories together with the CCD memory 20 being interfaced with the CUP (not shown) over a common bus in a manner that is well-known in the art. The CPU executes program instructions out of the two RAM buffers 20 and 24 in a manner that is well-known in the art. In this way, the CCD memory 20 remains transparent to the CPU and, similarly, the CPU remains transparent to the CCD memory 20. When a memory access request is received from the CPU, the 4 bit page address field of the access request is compared with the address of the pages stored in the buffers 22 and 24. If a comparison is found, data may be read from or written into the appropriate page buffer in which the requested address has been found. If no comparison is found, the CPU is forced into a wait state until a new block or page of data is transferred from the CCD memory 20 to the buffer memory not responsible for issuing the memory access request allowing a memory access to occur at a high execution rate as will be explained more fully hereinafter.

Referring again to FIGS. 1A and 1B, the memory system of the present embodiment includes a clock circuit for generating timing clock signals $\phi_1$ and $\phi_2$ used in accessing the data in the CCD memory 20. Unless otherwise indicated, positive logic is used throughout the logic circuits to be described hereinafter. Certain of the logical elements found therein will be identified by their part numbers, which are manufactured by a number of companies, for example, Texas Instruments Inc. The signals are illustrated in the drawings in their active state.

Figure 6:
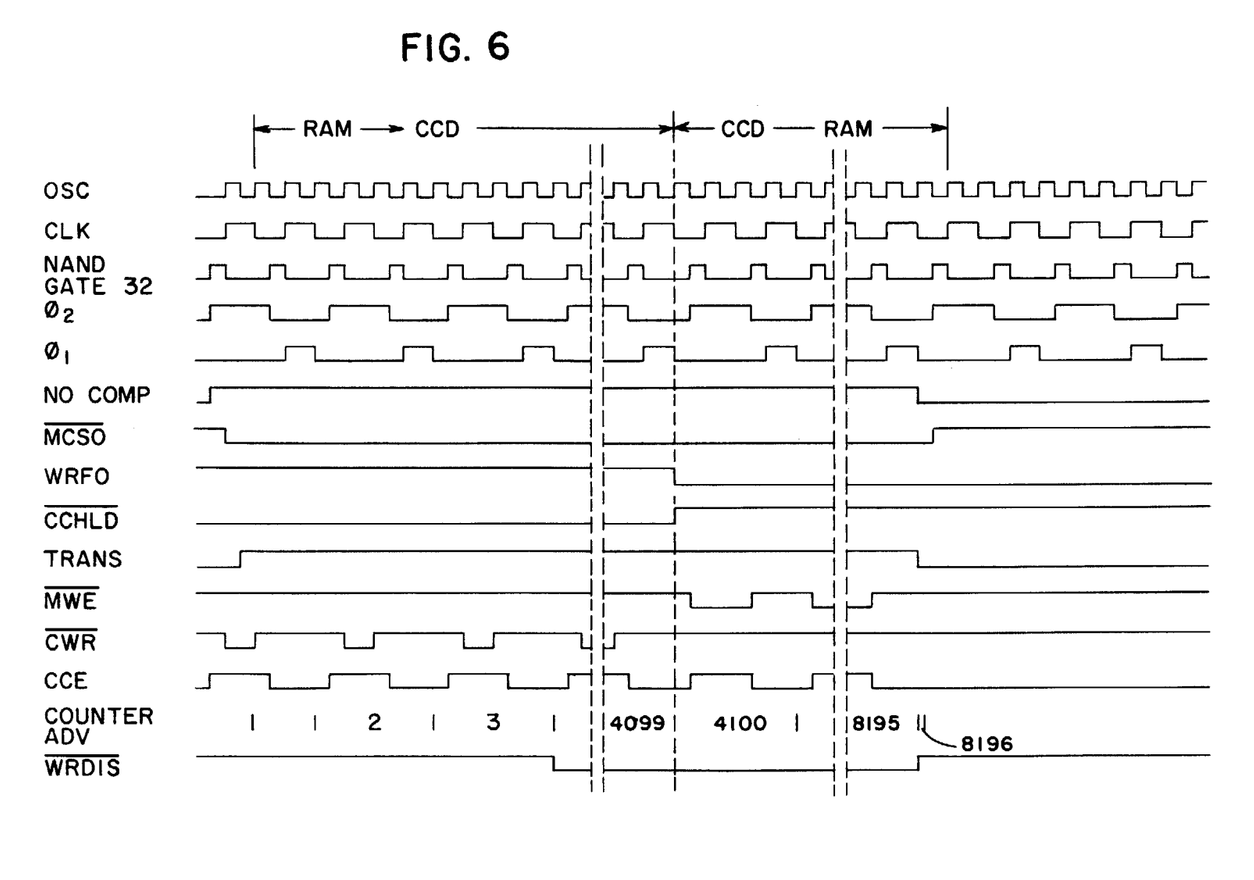
FIG. 6 is a timing diagram showing control signals used in transferring data between the CCD memory and the RAM buffer memories.

Included in the clock circuit (FIG. 1A) is a 20 Mhz. oscillator 26 whose output clock signals over line 28 toggles a LS74 D-type flip-flop 30. The output clock pulse of oscillator 26 is also coupled to one input of a NAND gate 32 over line 34. The 20 Mhz. clock signal is shown in FIG. 6. The Q output of the flip-flop 30 provides a 10 Mhz. clock pulse width which is designated CLK (FIG. 6) on line 38 and is also coupled to the other input of the NAND gate 32 whose output pulse will toggle a second LS74 D-type flip-flop 36 producing the $\phi_2$ clock pulse which in the present instance has a pulse width of 100 ns. The output clock pulse of NAND gate 32 and the $\phi_2$ clock pulse is shown in FIG. 6. The $\phi_2$ clock is produced on the Q output line 40 of the flip-flop 36 while a $\overline{\phi}_2$ clock pulse appears on the $\overline{Q}$ output line 42. The $\overline{\phi}_2$ clock pulse is coupled to the D input of the flip-flop 36 enabling the flip-flop 36 to output the clock pulse $\phi_2$ and $\overline{\phi}_2$. The $\overline{\phi}_2$ clock pulse is also coupled to one of the inputs of the NAND gates 44 and 46 (FIG. 1A). The other input of the NAND gate 44 receives the $\overline{\phi}$ output of the flip-flop 30 to output a $\phi_1$ clock pulse over line 48 having a pulse width of 50 ns. as shown in FIG. 6.

The $\phi_1$ clock pulse is coupled to an inverter 50 (FIG. 1A) to produce the $\overline{\phi}_1$ clock pulse over line 52 for use in accessing the CCD memory 20 as will be described hereinafter. The $\phi_1$ clock pulse is also coupled to one input of an AND gate 54 (FIG. 1A) whose output pulse is the CCD memory 20 chip select signal $\overline{CCS}$ used in accessing the CCD memory 20 in a manner that is well-known in the art. The other input of the AND gate 54 receives a control signal designated as $\overline{TRANS}$ which becomes high when the transfer of data word between the RAM buffers 20 and 24 and the CCD memory 20 reaches a predetermined number, in this case either 4,100 or 8,196. When the signal $\overline{TRANS}$ becomes high, the control signal $\overline{CCS}$ disables the transfer operation of the CCD memory as will be explained more fully hereinafter.

The control signal $\overline{TRANS}$ which is generated in the control circuit 90 (FIG. 1B) is also coupled to an input of the NAND gate 46 whose other input receives the $\overline{\phi}_2$ clock pulse from the $\overline{\phi}$ output of flip-flop 36 thereby enabling the NAND gate 46 to output over line 56 the chip enable control signal designated as CCE for use in accessing the CCD memory 20 in a manner that is well-known in the art. The CCE signal is coupled to an appropriate CCE driver 58 (FIG. 1B) for use in accessing the CCD memory 20. Also included in the accessing of the CCD memory 20 are the $\phi_1$ driver 60 and the $\phi_2$ driver 62 which also functions in a manner that is well-known in the art.

Whenever a memory access request is generated at the CPU, a 16 bit address is transmitted over a common bus which includes lines 64 (FIG. 1A), in which address bits BA12–BA15 are found comprising the address of the page in which the requested address identifying the data to be accessed is located. The data bits BA1-2–BA15 are coupled to the inputs of two four-bit address latches 66 and 68 each associated with one of the buffers 22 and 24. The latches 66 and 68 may be SNLS175 flip-flops available from Texas Instruments, Inc. The latch 66 associated with the buffer 22 stores the address of the page contained in the CCD memory that is now stored in the buffer 22. Latch 68 functions in the same manner with respect to buffer 24. The output of each of the latches 66 and 68 are coupled over line 69 to the input of a 2-1 data selector 70 whose output is coupled to one input of a second data selector 72 whose other input receives the page address bits BA12–BA15 over lines 64. The data selectors 70 and 72 multiplex the address of the page that is to be transferred from the CCD memory 20 (FIG. 1B) to the buffers 22 and 24. For reasons explained more fully hereinafter, the data selector 72 transmits the address of a page identified as bits CA12–CA15 in FIG. 1A which may comprise one of the page addresses stored in the 4 bit latches 66 and 68 or the page address identified by the data bits BA1-2–BA15 appearing on the common bus lines 64. The page address bits CA12–CA15 are coupled to the CCD memory 20 over line 74. The data selectors 70 and 72 may be SN54LS157 multiplexers available from Texas Instruments, Inc.

The output of the 4 bit latches 66 and 68 (FIG. 1A) are each coupled over line 75 to one input of an associated 4 bit comparator 76 and 78 respectively. The other input of the comparators 76 and 78 are coupled to the common bus lines 64 to receive the requested page address bits BA12–BA15 currently appearing on the lines 64. The comparators 76 and 78 will compare the requested page address with the page addresses currently stored in the RAM buffers 22 and 24 (FIG. 1B) as represented by the output of the 4 bit latches 66 and 68 to determine if a further search of the CCD memory 20 is required. As will be described more fully hereinafter, if a comparison is found in either of the RAM buffers 22 and 24, the system will access the page of data stored in the appropriate buffer in an access time associated with RAM memories. If no comparison is found, the system will force the CPU into a wait mode while the page containing the address requested by the CPU is transferred from the CCD memory to one of the buffers 22 and 24 in a manner that will now be described.

If a comparison is found in either of the comparators 76 and 78, (FIG. 1A), signals CMP0 or CMP1 appearing on the output lines 80 and 88 of the comparators 76 and 78 respectively will go high in accordance with the comparison found therein. The signal CMP0 is outputted over line 80 to one input of a NAND gate 82 and also to the inverter 98 whose output is coupled to the J input of a SN54LS109 J- $\overline{K}$ flip-flop 96. The output signal CMP1 of the 4 bit comparator 78 is coupled to the other input of the NAND gate 82 over line 88 and also to the $\overline{K}$ input of the flip-flop 96. The Q output of the flip-flop 96 is coupled over line 97 to one input of a non-inverting NAND gate 100 (FIG. 1B) while the $\overline{\phi}$ output of the flip-flop 96 is coupled to a second non-inverting NAND gate 102 (FIG. 1B). The NAND gates 100 and 102 are enabled by a signal received over line 107 from the output of an inverter 108 (FIG. 1B) to output the page pointer signals $\overline{MCS0}$ and $\overline{MCS1}$ which are the chip enable signals for the RAM buffers 22 and 24 (FIG. 1B) and which when active low point to the RAM buffer in which a comparison was found. It will be appreciated that in generating the chip enable signal $\overline{MCS0}$ and $\overline{MCS1}$ the RAM buffer in which the requested page of data is stored is automatically enabled to be accessed by the systems.

Depending in which RAM buffer the page address was found by the operation of the comparators 76 and 78, the flip-flop 96 will be toggled by the level of the compare signals CMP0 and CMP1 to output the corresponding active low control signal $\overline{MCS0}$ or $\overline{MCS1}$ thereby enabling its associated RAM buffer 22 or 24 to accept the address bits BA0–BA11 appearing on the common bus lines 104 (FIG. 1A) and which are transmitted to a data selector 106 (FIG. 1A) for access to the appropriate buffers 22 and 24 over line 110. The data so accessed by the address bits BA0–BA11 are transmitted from the appropriate RAM buffer 22 or 24 over line 112 (FIG. 1B) to a data driver 114 (FIG. 1B) for transmission over a common bus line 115 to the CPU. As will be described more fully with respect to the transfer of a page of data from the CCD memory 20 (FIG. 1B) to the RAM buffers 22 and 24 after a write operation has occurred, the flip-flop 96 will automatically be toggled to output one of the signals $\overline{\text{MCS0}}$ or $\overline{\text{MCS1}}$ indicating the buffer having the oldest used data contained therein.

The data selector 106 which may be of the same construction as data selectors 70 and 72 (FIG. 1A) is enabled by the level of the signal TRANS to select either the data bits BA0-BA11 appearing on the common bus lines 104 (FIG. 1A) for accessing into the RAM buffers 22 or 24 or the output of a SN54LS161 12 bit adder 118 (FIG. 1A) which outputs data bits CA0--CA11 comprising a data addressbased on the output count of a SN54LS83 12 bit address counter 120. As will be described more fully hereinafter, the address bits CA0-CA11 are used in transferring data between the CCD memory 20 and the RAM buffers 22 and 24 and may reflect the difference in speed between the slower CCE memory 20 and the faster RAM buffer memories 22 and 24 in locating the same bit location in both types of memory structures.

If in comparing the 4 bit page address appearing on the common bus line 64 (FIG. 1B) with the 4 bit page addresses stored in the latches 66 and 68, the comparators 76 and 78 (FIG. 1A) do not find a comparison, the output signals CMP0 and CMP1 (FIG. 1A) will be low enabling the NAND gate 82 (FIG. 1A) to output a binary one to the J input of a SN54LS109A J- $\overline{\text{K}}$ flip-flop 92 resulting in the appearance on its Q output line 93 of the active high non-compare signal NOCMP together with the appearance on the $\overline{\phi}$ output of the active low bus ready signal $\overline{\text{BRDY}}$ upon the clocking of the flip-flop 92. The active low signal $\overline{\text{BRDY}}$ is transmitted over the bus line 95 to the CPU which puts the CPU into a wait mode until the requested page is transferred from the CCD memory 20 to either of the buffers 22 and 24. As will be described more fully hereinafter with respect to FIG. 5, a clock signal CREQ for clocking the flip-flops 92 and 96 (FIGS. 1A and 8) is generated based on the bus memory request signal $\overline{\text{BMREQ}}$ (FIG. 7) transmitted from the CPU becoming active.

The active high output signal NOCMP (FIG. 1B) is transmitted to the control circuit 90 (FIG. 1B) which, as will be described more fully hereinafter, will generate the control signals TRANS and $\overline{\text{TRANS}}$ which affect a transfer operation. As described above, the signal NOCMP will be high when a comparison is not found between the page address data bits BA12-BA15 appearing on the bus line 64 with the page address data bits stored in the 4 bit latches 66 and 68 representing the address of the pages stored in the buffer memories 22 and 24. Upon the signal NOCMP going high, the signal TRANS will go high while the signal $\overline{\text{TRANS}}$ will go low initiating a transfer operation. Since the address of the requesting page appears on te bus lines 64, the system will access the CCD memory 20 with the requesting page address and transfer the page out of the CCD memory 20 and into one of the buffer memories 22 and 24 allowing a high speed memory access to occur once the new page of data is stored in the RAM buffer memories 20 or 24.

In transferring data from the CCD memory 20 (FIG. 1B) to the buffer memories 22 and 24, the address of the data word found in the CCD memory is shifted when transferred into the buffer memories 22 and 24 due to the difference in speed between the two memories. Thus, a memory location in the CCD memory 20 when transferred into the RAM buffer memory will not be at the same location in the latter memory due to the faster speed of the buffer memory. In order to compensate for this condition when transferring data from the RAM buffer memories to the CCD memory 20, the 12 bit address counter 120 (FIG. 1A) clocked by the clock signal $\phi_1$, will initiate a 12 bit count from 0 to 4,096 which may be used as the address of a 16 bit data word located in the buffers 22 and 24 (FIG. 1B) upon the initiation of a power up condition and will continuously output these counts. The output count of the address counter 120 is coupled to the 12 bit adder 118 (FIG. 1A) which when enabled adds 2 to every output count of the counter 120 thereby outputting the count bits CA0--CA11 comprising the data word address for each location in the RAM buffer 22 and 24. When transferring data from the CCD memory 20 to the RAM buffers 22 and 24, the adder 18 will be disabled and the address bits CA0-CA11 will correspond to the output count of the counter 180.

Upon the outputting of the active signals TRANS and $\overline{\text{TRANS}}$ as a result of the generation of the NOCMP signal, a SN54LS374 16 bit latch 119 (FIG. 1B) will be enabled to output a page of data from the CCD memory 20 corresponding to the page address bits BA12-BA15 appearing on the system bus line 64 (FIG. 1A) and which were transmitted through the data selector 72 to the CCD memory 20 (FIG. 1B). The page of data transmitted from the CCD memory 20 and through the 16 bit latch 119 (FIG. 1B) will be clocked out by the clock signal $\phi_1$ and transmitted over line 121 into one of the buffer memories 22 and 24 which has been selected by its chip select control signal $\overline{\text{MSC0}}$ or $\overline{\text{MSC1}}$ going low and stored at an address corresponding to the address bits CA0-CA11 transmitted through the data selector 106 from the counter 120 in the manner described above.

If a write operation had occurred on the pages of data stored in the buffer memories 22 and 24 (FIG. 1B), the page is required to be transferred back iinto the CCD memory 20 before a new page can be read out and stored in that buffer memory. Otherwise the new page transferred from the CCD memory 20 is written over the page of data stored in the designated RAM buffer. Whenever a write operation has occurred in one of the buffers 22 or 24, a control signal $\overline{\text{CCHLD}}$ generated in the control circuits 90 (FIG. 1B) will become active low, thereby notifying the system that the pageof data stored in the particular buffer being addressed has to be transmitted back to the CCD memory 20 before a new page of data can be transferred to the designated buffer. The control signal $\overline{\text{CCHLD}}$ going low will disable the data selector 72 (FIG. 1A) thereby disabling any transfer of page addresses into the CCD memory 20 (FIG. 1B) until a transfer operation between the buffers 22 and 24 and the CCD memory 20 has been completed. As described previously, the signal $\overline{\text{CCHLD}}$ going low will enable the adder 118 (FIG. 1A) to add two to the output of the counter 120 compensating for the difference in speed between the CCD memory 20 and the RAM buffer memories 22 and 24 (FIG. 1B).

As will be described more fully hereinafter with respect to the control circuits found in block 90 (FIG. 1B), the page of data in which a write operation has occurred is transferred out of the buffer memories 22 and 24 into the CCD memory after which the new page of data identified by the address bits BA12-15 present on the common bus line 64 is transferred from the CCD memory 20 into one of the buffers 22 or 24. A counter located in the control circuits 90 counts the number of transfers between the CCD memory and the RAM buffers 22 and 24. Upon completion of the transfer operation, the signals TRANS will go low and signal $\overline{\text{TRANS}}$ will go high enabling a new access operation to occur between the requested data addresses as represented by the data bits BA0–BA11 which are now transmitted over the bus line 104 (FIG. 1A) through the data selector 106 now enabled by the control signal TRANS going low. The address bits BA0–BA11 are transmitted in parallel to the appropriate RAM buffer 22 and 24 over line 110 in accordance with the signal $\overline{\text{MCS0}}$ or $\overline{\text{MCS1}}$ being in a low or active state. Thus, it will be seen that the accessing of the data contained in the CCD memory 20 is operated at a rate which is associated with the RAM buffer memories 22 and 24.

Figure 2:
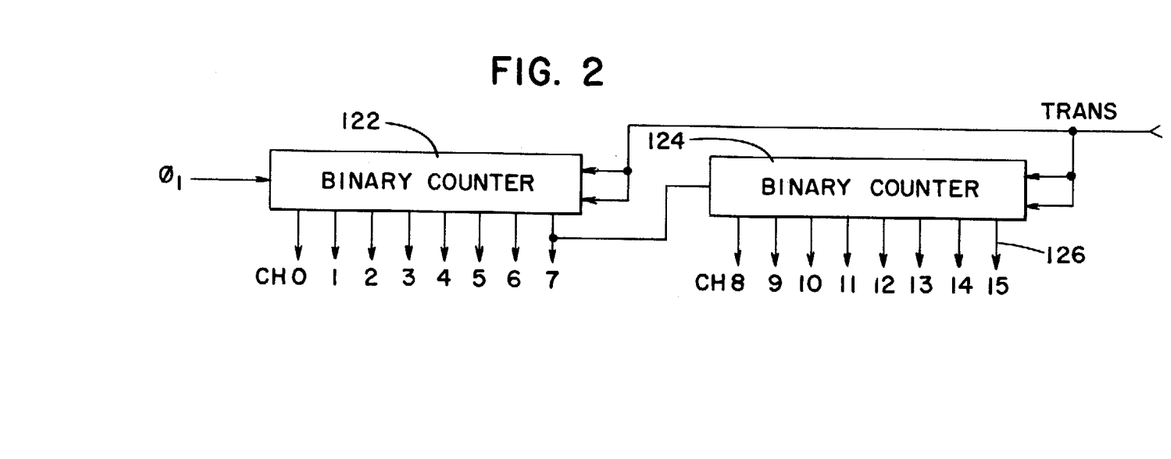
FIG. 2 is a logic diagram of a counter whose output count is used to control the transfer of data between the CCD memory and the RAM buffer memories.

Referring now to FIG. 2 there is shown a logic diagram of a pair of SN54LS393 binary counters 122 and 124 which are located in the control circuit block 90 (FIG. 1B) and which are continuously clocked by the $\phi_1$ clock to output on a plurality of output lines 126 a count between 0 and 32,768 in a manner that is well-known in the art. The binary counters 122 and 124 whose operation is initiated by the transfer signal $\overline{\text{TRANS}}$ going low at the start of a transfer operation will count the number of transfer operations that occur between the CCD memory 20 (FIG. 1B) and the buffer memories 22 and 24. In the case where a page of data is being transferred from the CCD memory 22 to one of the buffer memories 22 and 24, the signal appearing on the output line CH2 (FIG. 2) will be high when the count is 4 and on line CH 12 when the count is 4,096 indicating a total of 4,100 transfers which is the capacity of the RAM buffers 22 and 24, the signals controlling the transfer operation in a manner which will be described more fully hereinafter. When a transfer operation is to occur involving a buffer memory in which a write operation has occurred on the page of data stored therein, the page of data stored in the RAM buffer is required to be transferred back into the CCD memory 20 before a new page of data can be transferred from the CCD memory 20 to the RAM buffer. This operation requires 8,192 transfers which count is indicated when the signal appearing on line CH 13 of counter 124 goes high which signal is used to control the ending of the transfer operation. Other control signals include the signal appearing on line CH 11 which goes high upon the count reaching 2,048 and which is used to control portions of a transfer operation as will be described more fully hereinafter.

Figure 3:
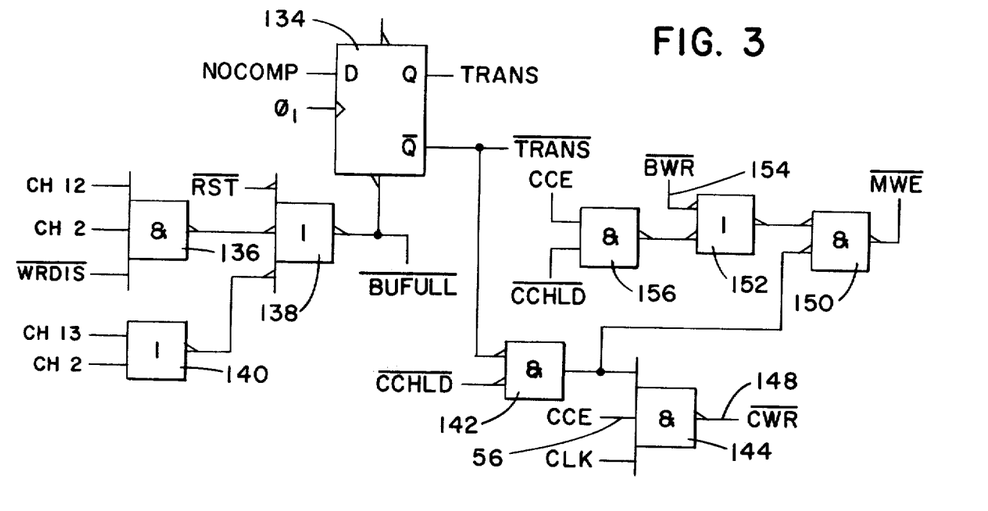
FIG. 3 is a detailed schematic diagram of a portion of the control system shown in FIG. 1 for controlling a memory write operation.

Referring now to FIG. 3 there is shown a schematic diagram of one of the logic circuits 90 (FIG. 1B) used to initiate a transfer operation together with generating signals for controlling a write operation. Included in the circuit is a transfer flip-flop 134 which comprises a D-type SN54LS574 flip-flop clocked by the $\phi1$ clock and whose D-input receives the active high control signal NOCMP (FIG. 6) appearing on the Q output of the J-$\overline{\text{K}}$ flip-flop 92 (FIG. 1A) as a result of the finding of a no comparison between the page address appearing on the common bus line 64 and the page addresses stored in the latches 66 and 68 (FIG. 1A). Upon the toggling of the flip-flop by the $\phi_1$ clock the $\overline{\text{Q}}$ output signal $\overline{\text{TRANS}}$ of the flip-flop 134 will go high (FIG. 6) while the Q output signal TRANS will go low initiating a transfer operation. At the end of a transfer operation in which 4,096 data words are transferred between the CCD and the buffer memories 22 and 24 (FIG. 1B), the output signal appearing on line CH2 of the binary counter 122 (FIG. 2) will be high indicating a count of four together with the high output signal appearing on line CH12 of counter 124 indicating a count of 4,096. This total count of 4,100 (FIG. 6) compensates for the difference in speed between the two memories and will appear on the input of the AND gate 136 whose other input contains a write disable control signal $\overline{\text{WRDIS}}$ which is high at this time enabling the NAND gate 136 to output a low signal to one of the inputs of a non-inverting NOR gate 138. The other inputs to the NOR gate 138 include a system reset signal $\overline{\text{RST}}$ which is high at this time and the output of a NAND gate 140 whose inputs are connected to the output lines CH2 and CH13 of counters 122 and 124 and on which appear high signals when the output of the counters 122 and 124 is at 8,196 (FIG. 6). At this time, both signals are low, thereby producing on the output of the NAND gate 140 a high signal which enables the NOR gate 138 to output a low signal $\overline{\text{BUFULL}}$ designating that the buffers are full. The signal $\overline{\text{BUFULL}}$ going low resets the transfer flip-flop 134 thereby pulling the output signal TRANS low and raising the $\overline{\text{Q}}$ output signal $\overline{\text{TRANS}}$ enabling the transfer operation to be terminated. As will be explained more fully hereinafter, the signal $\overline{\text{WRDIS}}$ (FIG. 6) is low during the transfer involving a write operation which disables the AND gate 136 from resetting the transfer flip-flop 134 at the count of 4100 and enabling the NOR gate 140 to output a low signal when the output lines CH2 and CH13 of the counters 122 and 124 reflect the count 8,196 as described above.

Also included in the logic circuitry shown in FIG. 3 are the generation of the buffer memory write enable signal $\overline{\text{MWE}}$ together with the CCD write enable signal $\overline{\text{CWR}}$ which enable write operations to occur in the RAM buffer 22 and 24 and the CCD memory 20 respectively. When a write operation is to occur in the CCD memory 20 (FIG. 1B) as a result of the signal NOCMP (FIG. 3) going high, the control signal $\overline{\text{TRANS}}$ will be low during the transfer operation. This signal will be transmitted into one of the inputs of the NAND gate 142 whose other input is connected to the control signal CCHLD which is high (FIG. 6) when no write operation has occurred in the RAM buffer memories 22 or 24. With these level inputs to the NAND gate 142, the output of the NAND gate 142 will be low which signal is transmitted to one of the inputs of the NAND gate 144 whose other input is connected to the CCD memory chip enable signal CCE (FIG. 6) generated over line 56 (FIG. 1A) from the NAND gate 46 (FIG. 1A) and the clock pulses CLK (FIG. 6) appearing over line 38 from the Q output of the flip-flop 30 in the clock circuit shown in FIG. 1A. Thus, upon the generation of the clock pulses CLK (FIG. 6) from the flip-flop 30, the output signal $\overline{\text{CWR}}$ appearing as a clock pulse (FIG. 6) will be outputted from the NAND gate 144 to the CCD memory 20 over line 148 (FIG. 1B) enabling new data to be transmitted into the CCD memory 20 through the data receiver 116 (FIG. 1B) and the 16 bit latch 120.

As will be described hereinafter, upon the initiation of a write operation in one of the buffer memories 22 or 24 (FIG. 1B), the control signal $\overline{\text{CCHLD}}$ will be high, which signal is transmitted into one of the inputs of the NAND gate 142 (FIG. 3), whose other input is connected to the $\overline{\text{Q}}$ output of flip-flop 134 on which appears the control signal $\overline{\text{TRANS}}$ which at this time is high. These signals enable the output signal of the NAND gate 142 to be low which signal is coupled to one of the inputs of the non-inverting NAND gate 150 (FIG. 3). The other input of the NAND gate 150 is coupled to the output of a non-inverting NOR gate 152 having one input connected to the bus line 154 (FIG. 1B, 3 and 4) on which appears the bus write signal $\overline{BWR}$ generated by the CPU. The other input to the NOR gate 152 is coupled to the output of a NAND gate 156 which is controlled by the chip enable signal CCE and the control signal $\overline{CCHLD}$. Thus, when the $\overline{CCHLD}$ signal and the CCE signal are high, the output signal of the NAND gate 156 will go low enabling, upon the bus write signal $\overline{BWR}$ becoming active low, the output signal of the NOR gate 154 to go low. This signal coupled with the low signal appearing on the other input of the non-inverting NAND gate 150 will output the signal $\overline{MWE}$ in a low or active state whenever the signal CCE is high. As shown in FIG. 1B, the signal MWE is transmitted to each of the buffer memories 22 and 24 which coupled with the appropriate chip select signals $\overline{MCS0}$ and $\overline{MCS1}$ will enable one of the buffers to be accessed by the address bits which are being outputted from the data selector 106 (FIG. 1A) as described previously.

Figure 4:
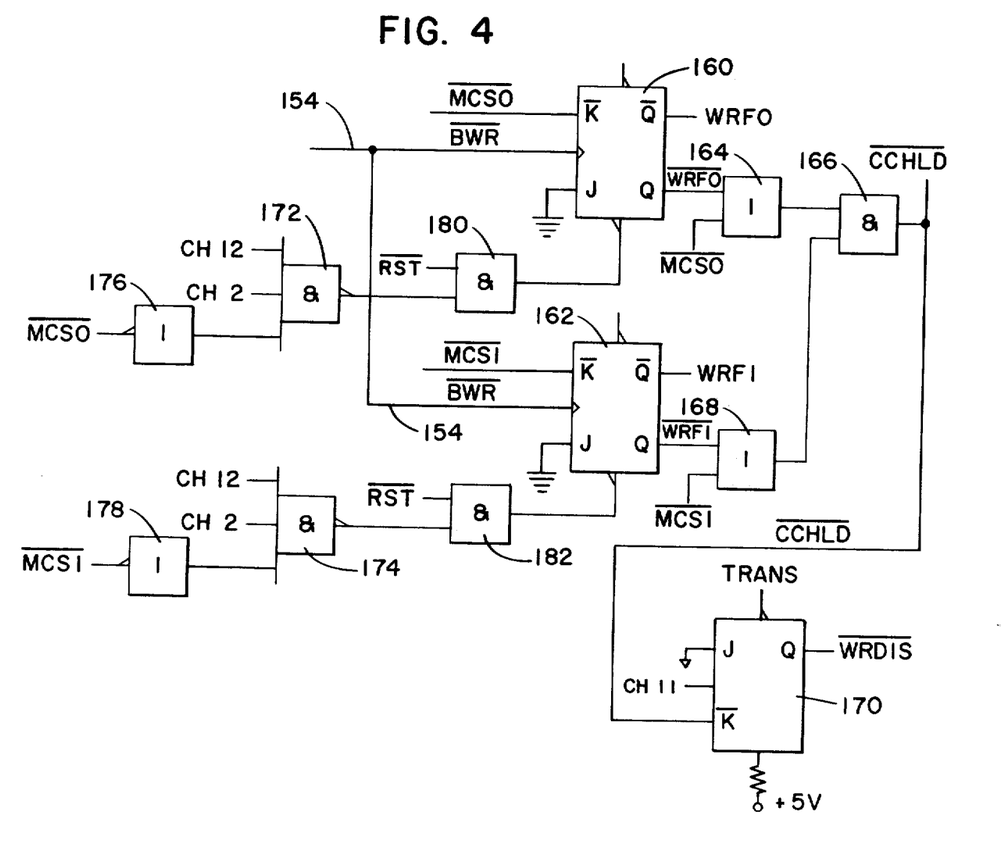
FIG. 4 is a detailed schematic diagram of a further portion of the control circuit shown in FIG. 1.

Referring now to FIG. 4, there is shown the control circuit for generating a write flag for each RAM buffer 22 and 24 (FIG. 1B) which flag notifies the system that a write operation has occurred on the data contained in its associated RAM buffers 22 and 24. The write flag signals the system that in transferring a new page of data from the CCD memory 20 into the selected buffer upon the finding of a no comparison, the page of data in the selected buffer has to be transferred back to the CCD memory before a new page of data can be stored in the buffer. Upon the generation of a write access request from the CPU, the bus write control signal $\overline{BWR}$ will be low which signal is transmitted over the common bus line 154 into the clock input of a pair of SN54LS019A J -$\overline{K}$ flip-flops 160 and 162. The $\overline{K}$ input of the flip-flop 160 is connected to the output of the NAND gate 100 (FIG. 1B) and on which will appear the chip select signal $\overline{MCS0}$ for the buffer 22. The $\overline{K}$ input of the flip-flop 162 is similarly connected to the NAND gate 102 (FIG. 1B) whose output signal MCS1 is transmitted to the flip-flop 162.

Figure 8:
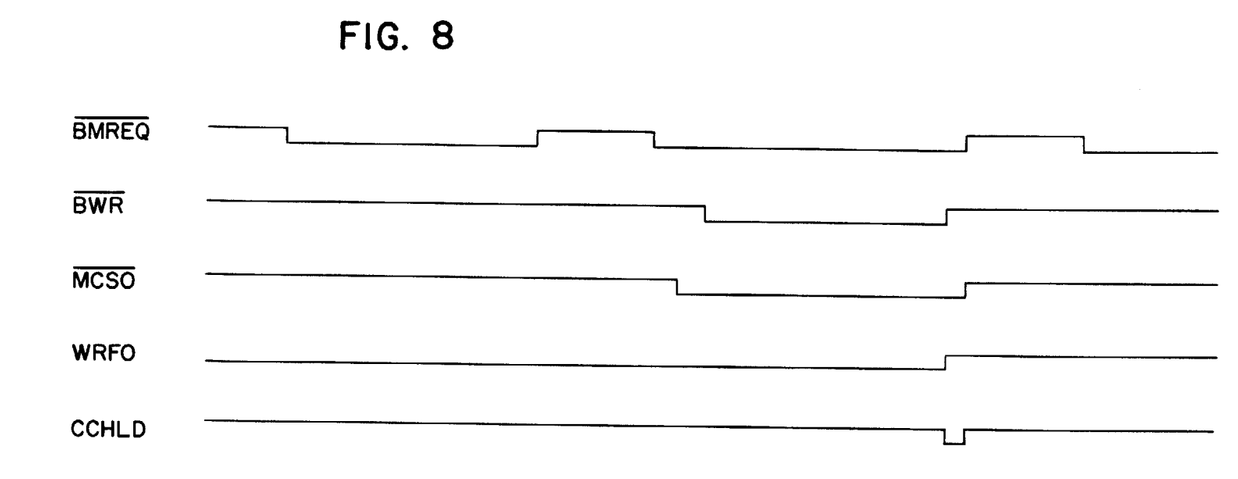
FIG. 8 is a timing diagram showing control signals used in writing data into the RAM buffer memories.

If a write operation is to occur in the page of data stored in either of the RAM buffers 22 or 24 (FIG. 1B), the chip select signal $\overline{MCS0}$ or $\overline{MCS1}$ associated with that buffer will be in a low state as a result of a compare operation in the manner described previously. Thus, assuming for the present illustration, the RAM buffer memory 22 has stored therein the page of data in which a write operation is to occur, the signal $\overline{MCS0}$ would be active low (FIG. 8) resulting in the $\overline{Q}$ output signal WRF0 of the flip-flop 160 going high upon the toggling of the flip-flop 160 by the control signal $\overline{BWR}$ going low (FIG. 8). The Q output signal $\overline{WRF0}$ of the flip-flop 160 will go low at this time which signal comprises the write flag for buffer 22 and is coupled to one input of the OR gate 164 on whose other input will appear the active low control signal $\overline{MCS0}$. With these two low input signals, the output of the OR gate 164 will go low which is coupled to one input of an AND gate 166 whose other input is connected to an OR gate 168 similarly arranged as OR gate 164 and whose output signal will be high at this time since the input signal $\overline{MCS1}$ to the flip-flop 162 is high. The AND gate 166 at this time will output the active low CCD memory hold signal $\overline{CCHLD}$ which is used in controlling the transfer of a page of data on which a write operation has occurred to the CCD memory 20 (FIG. 1B).

As shown in FIG. 8, upon the signal $\overline{BWR}$ going low thereby toggling the flip-flop 160, the output signal $\overline{CCHLD}$ of the AND gate 166 (FIG. 4) will go low until the bus memory request signal $\overline{BMREQ}$ goes high which, as will be described more fully hereinafter, resets the flip-flop 96 (FIG. 11) in which $\overline{MCSO}$ goes high (FIG. 8). When $\overline{MCSO}$ goes high, the output signal $\overline{CCHLD}$ goes low. As this occurs the flip-flop 160 remains in its set condition enabling the write flag $\overline{WRF0}$ appearing on the Q output of the flip-flop 160 to condition the OR gate 164 to output a low signal upon the input signal $\overline{MCSO}$ going low when the next compare generation occurs in which the requested page is located in RAM buffer 22. Upon the output of OR gate 164 going low, the $\overline{CCHLD}$ signal goes low signalling the system that the page of data in buffer 22 has to be transferred to the CCD before a new page of data can be transferred from the CCD memory 20 to the RAM buffer 22. As will be explained more fully with respect to FIG. 5, the RAM buffer 22 has been selected as the buffer containing the oldest data, that is, data which has not been accessed during the previous memory request cycle. The control signal $\overline{CCHLD}$ going low enables the adder 118 (FIG. 1A) to add two to the output count of the counter 120 and disables the data selector 72 from inputting an address from the common bus line 64 into the CCD memory 20.

The signal $\overline{CCHLD}$ is also transmitted to the K input of a J -$\overline{K}$ flip-flop 170 (FIG. 4) whose Q output comprises the write disable signal $\overline{WRDIS}$ and which is preset by the transfer signal TRANS when active high during a transfer operation of data between the RAM buffers 22 and 24 and the CCD memory 20 (FIG. 6). The clock input to the flip-flop 170 is connected to line CH 11 of the binary counter 124 which goes high when the output count of the binary counter reaches 2,048 (FIG. 6) thereby clocking the active low signal $\overline{CCHLD}$ into the flip-flop 170 at this time. When this occurs, the control signal $\overline{WRDIS}$ on the Q output of the flip-flop 170 will go low, which signal is transmitted to one of the inputs of the NAND gate 136 (FIG. 3) enabling the system to transfer the page of data on which a write operation has been performed from one of the buffer memory 22 and 24 (FIG. 1B) to the CCD memory 20 before a new page of data is transferred from the CCD memory 20 to the RAM buffer 22 and 24. This active low signal $\overline{WRDIS}$ together with the active high signals appearing on the lines CH2 and CH12 of the binary counter 124 (FIG. 3) at the end of transferring data from the RAM buffers 22 or 24 to the CCD memory 20 when the count reaches 4,100 will result in the AND gate 136 outputting a high signal which conditions the transfer flip-flop 134 to be reset when the input lines CH13 and CH2 to the NOR gate 140 (FIG. 3) go high at the count of 8,196 to enable the system to transfer a new page of data from the CCD memory 20 to the RAM buffers 22 and 24.

As shown in FIG. 6, at the end of the transfer of the data from the RAM buffers to the CCD memory, the signal $\overline{CCHLD}$ goes high in a manner that will now be described. At this time the output of the counters 122 and 124 (FIG. 2) will be at 4,100 with active high signals appearing on the output lines CH2 and CH12 of the counters. These signals will also appear on the inputs of the NAND gates 172 and 174 (FIG. 4). The other input to the AND gates is coupled to the chip select signals $\overline{MCS0}$ and $\overline{MCS1}$ which, when in a active low state enable the output of the NAND gates 172 and 174 to go high. The output of the NAND gates 172 and 174 are coupled to one input of AND gates 180 and 182 respectively whose other input is connected to a system reset signal $\overline{RST}$ which is high at this time. With two high signals on its input, the AND gate 180 will output a high clear signal to the flip-flop 160 resetting the flip-flop resulting in the signal $\overline{CCHLD}$ going high as a result of a high signal appearing on the output of the OR gate 164. As described previously, the Q output signal $\overline{WRFO}$ of the flip-flop 160 is the write flag for buffer 22 which signal will go high upon the resetting of the flip-flop 160.

Figure 7:
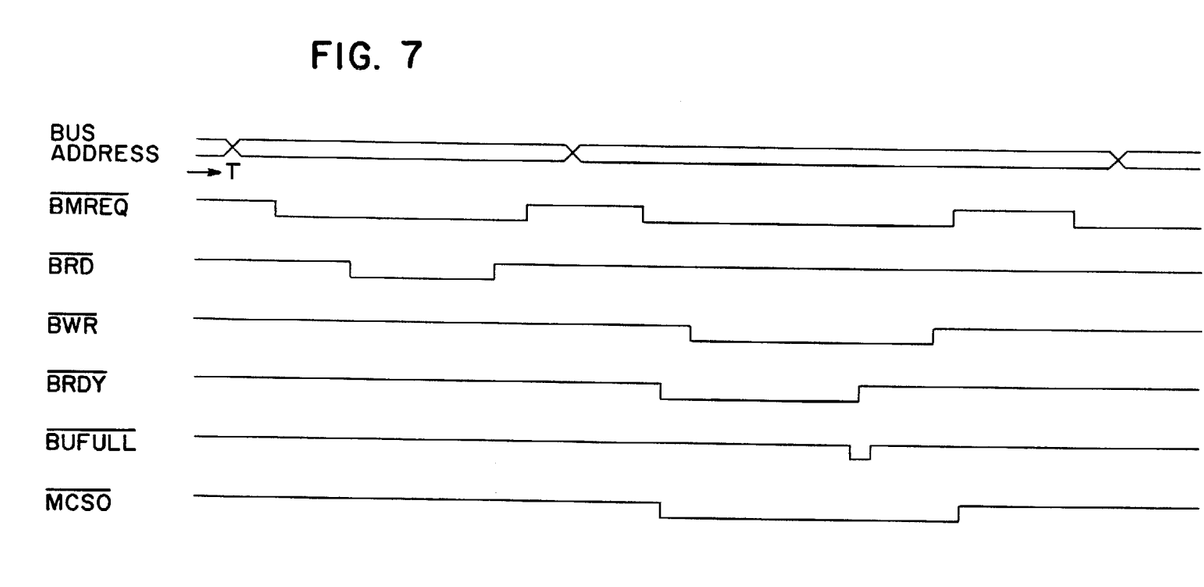
FIG. 7 is a timing diagram of the operation of the common bus utilized in the present invention.

Upon completion of the transfer of the page of data to the RAM buffers 22 or 24 from the CCD memory 20 (FIG. 1B), the counters 122 and 124 (FIG. 2) will be at a count of 8,196 in which active high signals will appear on the output lines CH2 and CH13 (FIG. 2) which signals are transmitted to the NOR gate 140 (FIG. 3) enabling the gate to output a low signal to the NOR gate 138 whose other inputs are high at this time. The output signal $\overline{BUFULL}$ of the NOR gate 138 going low (FIG. 7) at this time resets the transfer flip-flop 134 terminating the transfer operation. As shown in FIG. 7, upon the $\overline{BUFULL}$ signal going low, the bus ready signal $\overline{BRDY}$ will go high notifying the CPU to initiate a new memory access operation.

Figure 5:
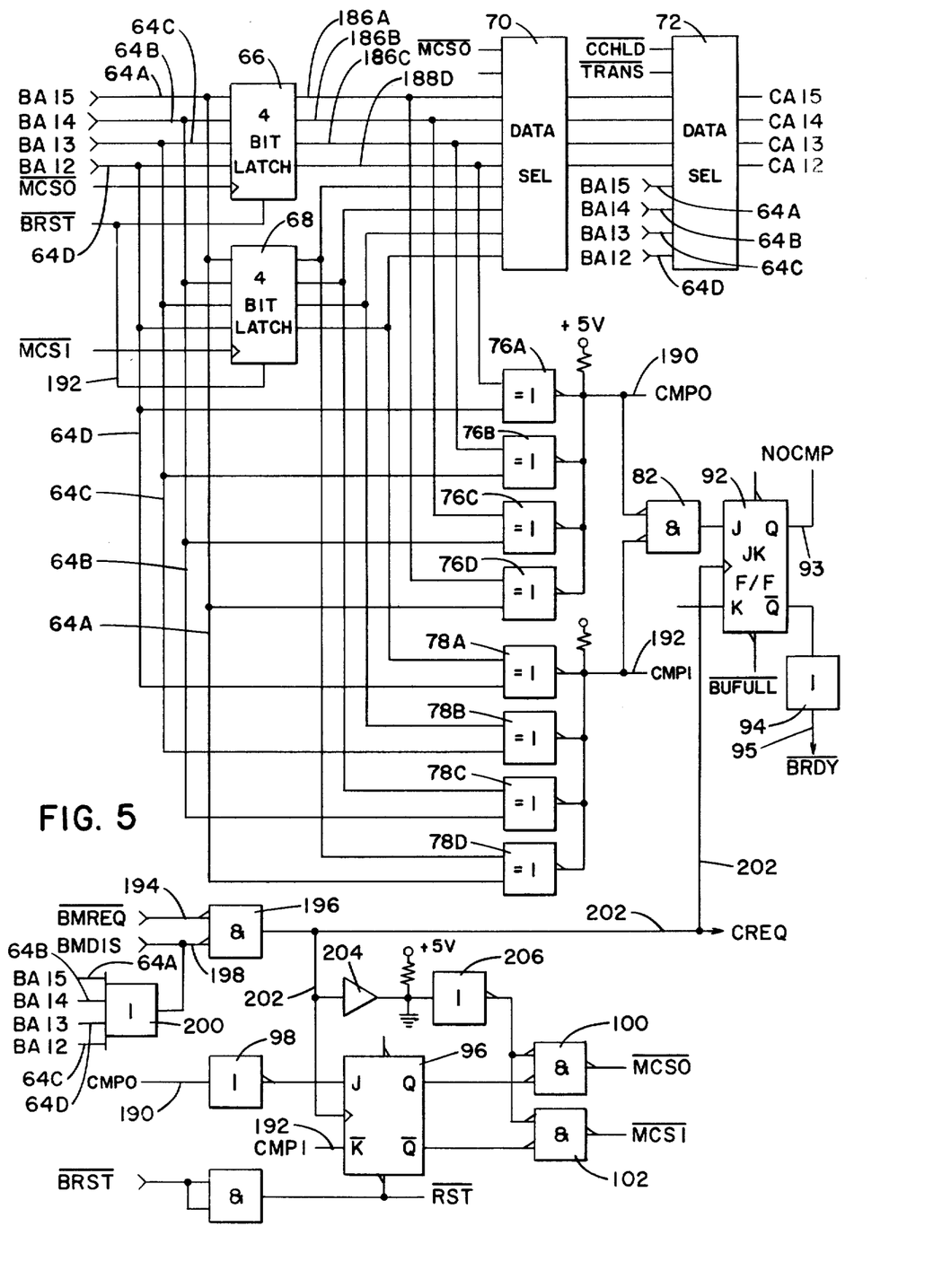
FIG. 5 is a detailed schematic diagram of the address select circuit shown in FIG. 1.

The logic circuit for generating the page pointer signals $\overline{MCS0}$ and $\overline{MCS1}$ is shown in more detail in FIG. 5. The bus lines 64A-64D over which the page address bits BA12-BA15 are received from the CPU are shown being coupled to the four bit latches 66 and 68 together with a plurality of exclusive OR gates 76A-D inclusive comprising the comparators 76 and exclusive OR gates 78A-D inclusive comprising the comparator 78. The output lines 186A-186D inclusive of the latch 66 are coupled respectively to one of the input lines 187 of the exclusive OR gates 76A-D inclusive for the transmission of the page address bits BA12-15 inclusive stored in the latch to the exlusive OR gates 76A-D inclusive. The other input line 189 of the exclusive OR gates 76A-D inclusive are connected to the bus lines 64A-D inclusive for receiving the bus address bits appearing on the bus line for comparing the requested page address with the page address stored in the latch 66. The page address stored in the latch 66 represents the page stored in the RAM buffer 22 (FIG. 1B). A similar construction is found with respect to the exclusive OR gates 78A-D inclusive for comparing the address of the page of data stored in the buffer 24 (FIG. 1B).

If a comparison is found, in either of the comparators 76 or 78, one of the corresponding output compare signals CAM0 or CAM1 will become high in accordance with the buffer in which the comparison was found. The signal CMP0 is coupled over line 190 to the inverter 98 (FIG. 5) while the signals CMP1 is coupled over line 192 to the $\overline{K}$ input of the J-$\overline{K}$ flip-flop 96. If the signal CMP0 is high, the output of the inverter 98 will be low, which signal is transmitted to the J input of the flip-flop 96 conditioning the flip-flop to be toggled by a clock signal appearing on line 202 resulting in the Q output of the flip-flop 96 going low. As seen in FIG. 5, the Q output of the flip-flop 96 is coupled to one input of the non-inverting AND gate 100 whose other input is high at this time, thereby enabling the AND gate 100 to output an active low signal $\overline{MCS0}$ which identifies or points to which one of the RAM buffers 22 or 24 (FIG. 1D) contains the page of data that is being requested by the CPU in accordance with the page address carried on the column bus line 64A-D inclusive. The signal $\overline{MCS0}$ is transmitted to the RAM buffer 22 (FIG. 1B) functioning as the chip select signal for the RAM buffer allowing the RAM buffer to be accessed by the address bits BA0-BA11 (FIG. 1A) transmitted over the column bus line 109 through the data selector 106 to the RAM buffer memory 22 over line 110.

If the compare signal CMP1 becomes high indicating the page of data addressed by the address bits BA12-BA15 inclusive is stored in the RAM buffer memory 24, the signal CMP1 is transmitted over line 192 to the $\overline{K}$ input of flip-flop 96 which upon the clocking of the flip-flop 96 will result in the $\overline{Q}$ output of the flip-flop 96 going low which signal is transmitted to one input of the non-inverting AND gate 102. The output of the AND gate 102 will become low, thereby outputting the chip select signal $\overline{MCS1}$ enabling the data address bits BA0-BA11 transmitted from the data selector 106 (FIG. 1A) to access the RAM buffer memory 24. As previously described, the accessed data is transmitted from the RAM buffer memories 22 and 24 over line 112 to the bus driver 114 for transmission over the common bus line 116 to the CPU.

As will be described hereinafter, the chip select signals $\overline{MCS0}$ and $\overline{MCS1}$ upon becoming active after a comparison is found will enable their associated latches 66 and 60 to store the compared page address appearing on the bus line 64A-D inclusive, thus conditioning the logic to provide a rapid memory access to the data stored in the CCD memories 20 upon the occurrence of the next memory access generated by the CPU. The signal $\overline{MCS0}$ controls the data selector 70 (FIG. 1A) to transmit the page address stored in the latches 66 and 68 in accordance with the level of the signal. If $\overline{MCS0}$ is active low, the page address stored in latch 66 is transmitted to the data selector 72 while if $\overline{MCS0}$ is high, the page address stored in latch 68 is transmitted to the data selector 72. Thus, when the page of data in which a write operation has occurred is required to be transferred to the CCD memory 20 from the particular RAM buffer memories 22 and 24 prior to the transfer of the page requested by the CPU to the buffer, the signal $\overline{MCS0}$ controls the data selector 70 (FIG. 5) to output the proper page address to the data selector 72. The data selector 72 is enabled by the active low control signals $\overline{CCHLD}$ and $\overline{TRANS}$ to output the page address received from the data selector 70 to store at the proper address in the CCD memory 20 the page of data being transferred from the RAM memory. As described previously, at the end of the first transfer operation, $\overline{CCHLD}$ goes high (FIG. 6) resulting in the page address appearing on the bus lines 64A-D inclusive being selected by the data selector 72 for transmission to the CCD memory 20 and will appear as address bits CA12-CA15 inclusive which are parallel loaded into the CCD memory 20 (FIG. 1B) enabling the requested page of data to be transferred to one of the RAM buffer memories 22 and 24 in a manner that will now be described.

If no comparison is found as a result of comparing the requested page address with the page addresses stored in the latches 66 and 68, both signals CMP0 (FIG. 5) and CMP1 will be low. It is assumed for purposes of this illustration that no write operation has occurred in either of the RAM buffers 22 and 24. The signals CMP0 and CMP1 are transmitted over line 190 and 192 to the inputs of the NAND gate 82 whose output is coupled to the J input of the J -K flip-flop 92. The output of the NAND gate 82 will be high when no comparison is found resulting in the Q output of the flip-flop 92 going high, thereby establishing the active high no compare signal NOCMP while the $\overline{Q}$ output of the flip-flop 92 goes low. This latter signal is transmitted through the inverter 94 establishing the high bus ready signal $\overline{BRDY}$ which signal is transmitted over the bus line 95 to the CPU putting the CPU into a wait mode until the requested page can be transferred from the CCD memory to one of the RAM buffer memories 22 and 24 (FIG. 1B).

As shown in FIG. 7, the bus memory request signal $\overline{BMREQ}$ generated in the CPU goes low after the bus address line 64 (FIG. 1A) becomes stable at time T, in which a page address has appeared on the common bus line 64. After a new address has appeared on line 64 the signal $\overline{BMREQ}$ becomes active low. Since the no compare signal NOCMP is presently low, it is necessary to stop the CPU until the page of data being accessed by the CPU is transferred from the CCD memory 20 to one of the RAM buffers 22 or 24 (FIG. 1B). To put the CPU into a wait mode, the bus ready signal $\overline{BRDY}$ goes low upon the no compare signal NOCMP becoming an active high in the manner described previously.

As described hereinbefore, the active high no compare signal NOCMP is transmitted to the D input of a flip-flop 134 (FIG. 3) resulting in the initiation of a transfer operation in which the Q output signal TRANS of the flip-flop 134 goes high and the $\overline{Q}$ output signal $\overline{TRANS}$ goes low. Upon $\overline{TRANS}$ going low, the data selector 72 will be enabled to transmit the page address bit BA12-15 inclusive appearing on the bus lines 64A-D inclusive to the CCD memory 20 since the control signal $\overline{CCHLD}$ is high at this time. The page of data is transferred to the RAM buffer containing the oldest page of data, in a manner that will now be described.

During the last compare operation in which a comparison was found, the flip-flop 96 (FIG. 5) was set to output the proper signals resulting in one of the chip select signals $\overline{MCS0}$ or $\overline{MCS1}$ going active low pointing to the buffer containing the requested page of data. If the next access operation results in a no compare operation, the new page of data is to be transferred to the other buffer in which the last compare operation was not found. This is accomplished by inputting of a high signal to the J input of the flip-flop 96 and a low signal to the $\overline{K}$ input as a result of the input signals CMP0 and CMP1 being low in the manner described previously. Upon receiving these level input signals the flip-flop 96 will be toggled to output the other chip select signal active low which signal points to the buffer containing the oldest page. The active low chip select signal will enable its associated RAM buffer to receive the new page of data being transferred from the CCD memory 20 (FIG. 1B).

At the end of 4,096 transfer operations in which a new page of data is stored in the oldest buffer, the signals on the output lines CH2 and CH12 of the binary counters 122 and 124 (FIG. 2) will go high, thereby enabling the NAND gate 136 (FIG. 3) and the non-inverting NOR gate 138 to output the active low reset signal $\overline{BUFULL}$ indicating that the RAM buffer is full of data. The signal $\overline{BUFULL}$ resets the flip-flop 134 resulting in the signal $\overline{TRANS}$ going high and the signal TRANS going low ending the transfer operation. As shown in FIG. 7, the bus memory request signal $\overline{BMREQ}$ goes high after the reset signal $\overline{BUFULL}$ goes low. The signal $\overline{BUFULL}$ also resets the flip-flop 92 (FIG. 1A and 5) resulting in the bus ready signal $\overline{BRDY}$ going high which signals the CPU to raise the signal $\overline{BMREQ}$ to initiate a memory access operation.

There will now be described the operation of the memory system wherein a no comparison is found with respect to the page address appearing on the bus line 64 (FIG. 1A) and the selected RAM buffer 22 or 24 (FIG. 1B) is found to contain a page of data in which a write operation has occurred. As described above, the flip-flop 96 (FIG. 5) will be toggled by the low signals CMP0 and CMP1 to point to the buffer containing the oldest page of data by enabling one of the chip select signals $\overline{MCS0}$ or $\overline{MCS1}$ to become active low. Assume that the $\overline{MCS0}$ becomes active low and when applied to the OR gate 164 (FIG. 4) results in the signal $\overline{CCHLD}$ becoming active low as a result of the flip-flop 160 being set to output the low write flag signal on its Q output. The signal $\overline{CCHLD}$ going low enables the adder 118 (FIG. 1A) to add two to the output count of the counter 120 enabling the transfer of the page of data from buffer 22 to the CCD memory 20 (FIG. 1B).

The active low signal $\overline{CCHLD}$ also enables the data selector 72 to output the page address from latch 66 enabling the page of data tranferred from buffer 22 to be stored in the CCD memory 20. The active low signal $\overline{CCHLD}$ also conditions the flip-flop 170 (FIG. 4) to output the signal $\overline{WRDIS}$ to NAND gate 136 (FIG. 3) upon the transfer count reaching 2,048 enabling the transfer operation to continue until the transfer count reaches 8,196 at which time the transfer flip-flop 134 (FIG. 3) is reset ending the transfer operation.

Upon the transfer count reaching 4,096, the flip-flop 160 (FIG. 4) is reset resulting in the signal $\overline{CCHLD}$ going high (FIG. 6) enabling the data selector 72 to output the requested page address appearing on bus line 64A-D inclusive (FIG. 5) to the CCD memory for use in transferring the page to the buffer 22. Upon the signal $\overline{CCHLD}$ going high, the adder 118 (FIG. 1A) will be disabled allowing the data selector 106 to output the count of the counter 120 to the buffer 22 (FIG. 1B) for use in storing the transferred page of data therein. Upon the resetting of the transfer flip-flop 134 (FIG. 3) the signal TRANS will go low allowing the data address bits BA0-BA11 (FIG. 1A) appearing on bus lines 104 to be transmitted through the data selector 106 to the buffer 22 for completion of the memory access operation.

As shown in FIGS. 1A and 5, the bus memory request signal $\overline{BMREQ}$ is transmitted over the common bus line 194 to one input of the NAND gate 196 whose other input is connected to the bus line 198 on which appears the bus memory disable signal BMDIS generated from the CPU and which is normally low at this time. Also connected to the common bus line 198 is the output of an OR gate 200 having the common bus input lines 64A-D included and in which will appear the address of the requested page of data from the CPU. When the signal $\overline{BMREQ}$ becomes active low (FIG. 7) indicating the start of a memory request operation, the output signal CREQ of the NAND gate 196 becomes active low due to the high signals appearing on the common bus line inputs 64A-D inclusive to the OR gate 200 (FIG. 5). The rising edge of the signal CREQ clocks the flip-flops 92 and 96 (FIGS. 1A and 5) over line 202 and is also transmitted through the amplifier 204 (FIG. 1A) and the inverter 206 whose output low signal conditions the non-inverting AND gates 100 and 102 (FIG. 1B) to output the active low RAM buffer chip select signals $\overline{\text{MCS0}}$ and $\overline{\text{MCS1}}$ when a comparison is found between the address of the requested page appearing on the bus line 64 and one of the pages of data stored in the RAM buffers 22 and 24 (FIG. 1B). The active high control signal CREQ is also coupled to one input of a NAND gate 208 (FIG. 1B) whose other input is coupled to the output of an inverter 210 which receives the bus read signal $\overline{\text{BRD}}$ over the common bus line 212 from the CPU. When a read request is received from the CPU after the signal $\overline{\text{BMREQ}}$ goes low (FIG. 7), the signal $\overline{\text{BRD}}$ will be active low which signal will be inverted by the inverter 210 enabling the NAND gate 208 to output a low signal to the data driver 114 (FIG. 1B) disabling the driver during the read operation.

After a predetermined time period, the signal $\overline{\text{BMREQ}}$ goes high (FIG. 7) disabling the memory access operation and conditioning the logic for the next memory access time when a new page address appears on the bus line 64 (FIG. 1A) together with the data access address bits appearing on the bus line 104 (FIG. 1A). Upon the signal $\overline{\text{BMREQ}}$ going high the flip-flop 96 (FIG. 5) is toggled resulting in one of the output signal $\overline{\text{MCS0}}$ or $\overline{\text{MCS1}}$ going high, enabling its associated latch 66 or 68 (FIG. 1A) to latch the page address appearing on the bus lines 64A-D inclusive (FIG. 5) thus storing the address of the current page of data stored in its associated RAM buffer 22 or 24 (FIG. 1B).

While there has been described a form of the invention and its mode of operation, it will be apparent to those skilled in the art that changes may be made in the circuits described without departing from the spirit and scope of the invention as set forth in the appended claims and that in some cases certain features of the invention may be used to advantage or modified without corresponding changes in other features while certain features may be substituted for or eliminated as appreciated by those skilled in the art.

What is claimed is:

1. A memory system for use in a data processing system in which a central processor generates a sequence of requested read and write instructions including the address of the data to be accessed over a common bus, said system comprising:

a first operating main memory unit coupled to said common bus for storing data to be accessed by the central processor over said common bus;

a plurality of buffer memory units each having a higher operational speed than said first main memory unit and coupled to said main memory unit and the common bus for storing a portion of the data stored in said main memory unit;

an address register for each of said buffer memory units coupled to the common bus for storing the addresses of the data stored in an associated buffer memory unit;

comparison means for each of said buffer memory units coupled to the common bus and the address registers of an associated buffer memory unit for comparing the address of the requested data appearing on the common bus with the addresses stored in its coupled address register for outputting a first control signal upon finding a coincidence in one of said buffer memory units and a second control signal upon finding no coincidence in any of the buffer memory units;

a first bi-stable means coupled to the output of each of said comparision means, said common bus and said address registers for outputting a first memory enabling signal in response to the generation of said first control signal enabling the buffer memory unit in which the coincidence was found to be accessed by the address of the requested data appearing on the common bus, and enabling said address registers to store the address of the data written into said buffer memory units, said first bi-stable means being further operated in response to said second control signal and to the generation of the next sequential read and write instruction to output said first memory enabling signal to the buffer unit not previously accessed thereby enabling said buffer unit to receive the requested data from the main memory unit for storage therein;

and a second bi-stable means coupled to the output of each of said comparison means for outputting a third control signal in response to the generation of said second control signal, said system further including a third bi-stable means coupled to the output of said second bi-stable means for outputting a fourth control signal initiating the transfer of the requested data from the main memory unit to one of said buffer memory units in response to receiving said third control signal.

2. The memory system of claim 1 wherein said first operating main memory unit comprises a chargecoupled device memory and each of said buffer memory units comprises a dynamic random-access memory.

3. The memory system of claim 2 which further includes fourth bi-stable means coupled to the output of said first bi-stable means and said common bus, said fourth bi-stable means in response to receiving a write signal from the central processor over the common bus and said first memory enabling signal from said first bi-stable means outputs a fifth control signal indicating a write operation has occurred in the data stored in the buffer memory enabled by said first memory enabling signal.

4. The memory system of claim 3 which further includes:

first gate means coupled to the output of said fourth and first bi-stable means to output a sixth control signal upon receiving said first memory enabling signal and said fifth control signal, and second gate means coupled to the output of said first gate means and said third bi-stable means to output a second memory enabling signal to said main memory unit in response to the generation of said fourth and sixth control signals whereby the main memory unit is enabled to receive the data stored in the buffer memory unit selected by said first enabling signal prior to the transfer of the requested data from the main memory unit to the selected buffer memory unit.

5. The memory system of claim 4 which further includes first counter means coupled to the output of said third bi-stable means and responsive to the generation of said fourth control signal for outputting a first count equal to the storage capacity of said main memory unit and a second count equal to the capacity of both the main memory unit and a buffer memory unit, said first counter means coupled to said third bi-stable means for disabling said third bi-stable means upon outputting said first count thereby disabling the transfer of data from the main memory unit to the buffer memory unit.

6. The memory system of claim 5 which further includes:

second counter means coupled to each of said buffer memory units for outputting a count comprising the address location of data transmitted to said buffer memory unit from main memory units;

and decoding means coupled to said common bus on which are present the address of the requested data and said second counter means, said decoder means coupled to the output of said third bi-stable means and adapted to select the output of said second counter means for transmission to one of said buffer memory units upon receiving said fourth control signals whereby the data transferred from said main memory unit to one of said buffer memory units is stored at an address generated by said second counter means.

7. The memory system of claim 6 which further includes adding means coupled to said second counter means and said decoding means for adding a count to the output of said second counter means when enabled, said adding means further coupled to the output of said first gate means and enabled upon the generation of said sixth control signal to output the address of the data stored in the buffer memory for transfer of the data to the main memory unit.

* * * * *